United States Patent [19]

Futaba et al.

[11] Patent Number: 4,619,339
[45] Date of Patent: Oct. 28, 1986

[54] FLUID PRESSURE CONTROL DEVICE IN POWER STEERING APPARATUS

[75] Inventors: Takeshi Futaba; Masahiko Noguchi, both of Yao, Japan

[73] Assignee: Koyo Jidoki Kabushiki Kaisha, Nara, Japan

[21] Appl. No.: 674,073

[22] Filed: Nov. 23, 1984

[30] Foreign Application Priority Data

May 9, 1984 [JP] Japan .......................... 59-67294[U]

[51] Int. Cl.⁴ .............................................. B62D 5/08
[52] U.S. Cl. ................................ 180/143; 91/375 A; 91/434
[58] Field of Search ............... 180/132, 141, 142, 143, 180/148; 91/375 A, 434

[56] References Cited

U.S. PATENT DOCUMENTS

| | | | |
|---|---|---|---|
| 3,183,992 | 5/1965 | Brueder | 180/143 |
| 3,426,612 | 2/1969 | Henry-Biabaud | 180/143 |
| 3,565,205 | 2/1971 | Planas | 91/434 |
| 3,833,081 | 9/1974 | Suzuki | 180/143 |
| 3,964,371 | 6/1976 | Wagner et al. | 91/434 |
| 4,373,598 | 2/1983 | Elser | 180/143 |
| 4,434,866 | 3/1984 | Duffy | 180/143 |

*Primary Examiner*—John J. Love
*Assistant Examiner*—Charles R. Watts
*Attorney, Agent, or Firm*—Robert E. Burns; Emmanuel J. Lobato; Bruce L. Adams

[57] ABSTRACT

Disclosed is a device for controlling the pressure of a fluid supplied to a power steering apparatus in response to the speed of a vehicle. The device is arranged such that in a fluid return passage from the power steering apparatus to a pump, there is provided a throttle valve controlled by the speed of the vehicle, so that the controlled oil pressure is guided to an oil pressure reaction chamber in the power steering apparatus.

3 Claims, 1 Drawing Figure

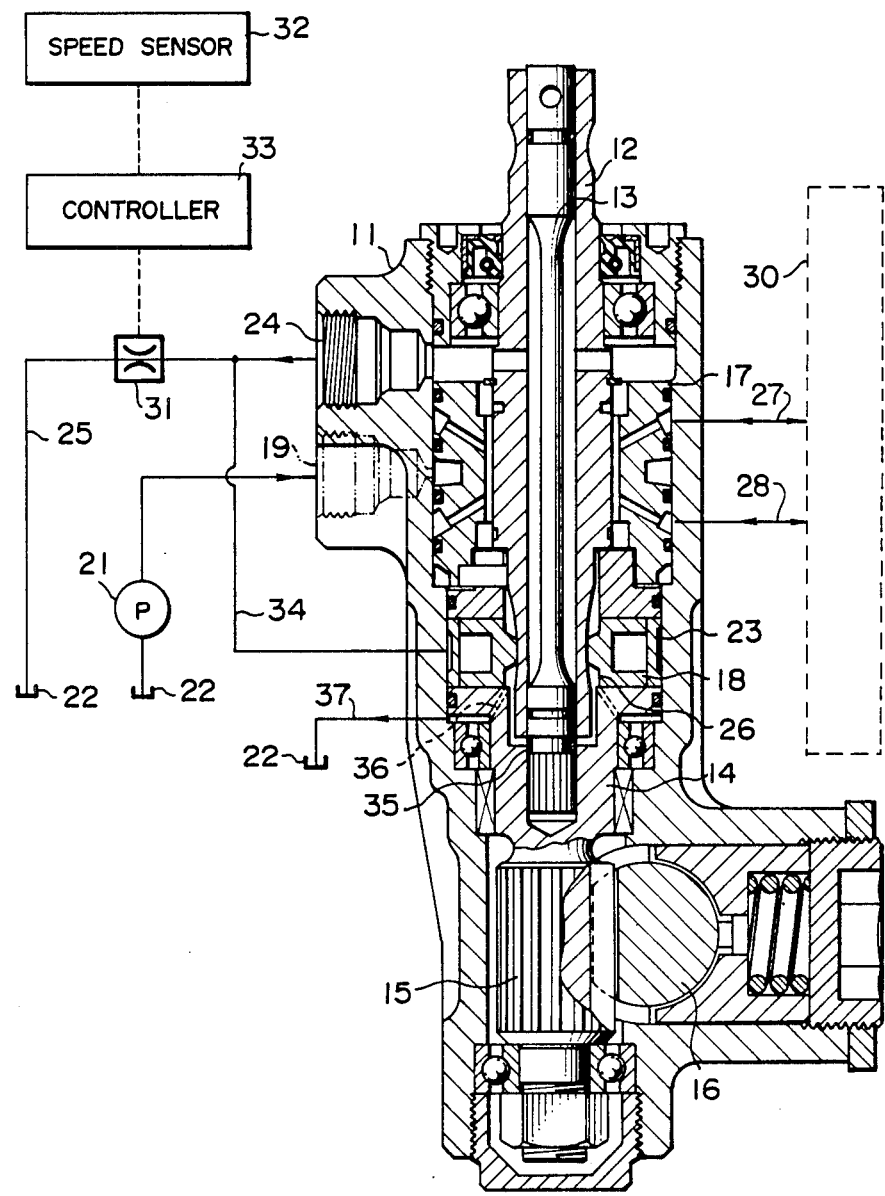

FLUID PRESSURE CONTROL DEVICE IN POWER STEERING APPARATUS

BACKGROUND OF THE INVENTION

1. Field of the Invention

The present invention relates to a power steering apparatus with fluid under pressure and particularly to a device for controlling fluid pressure supplied to a power steering apparatus in response to the speed of a vehicle.

2. Description of the Prior Art

It is widely known that after being made increased by a power steering apparatus having an elastic torsion bar, rotary torque from a steering wheel is transmitted to the vehicle wheels. For example, U.S. Pat. No. 3,433,127 discloses a power steering apparatus, in which a control valve controlled with fluid pressure is provided between an input shaft and an output shaft and the pressure fluid from a pump is selectively supplied in accordance with the relative displacement of the control valve to power-assist the rotation of the output shaft so as to make the steering wheel operate. The provision of such a power steering apparatus makes easier the steering of the vehicle. In the steering of the vehicle, however, it is desirable to obtain a larger power during running at low speed than at high speed. To this end, it has been also proposed that the torque generated in a power steering apparatus is be controlled in accordance with the speed of the vehicle.

It is disclosed, for example, in U.S. Pat. No. 4,034,825 that the torque generated in a power steering apparatus is controlled in accordance with the speed of the vehicle. In the power steering apparatus of this U.S. Patent, a torsion bar is positioned within a hollow input shaft connected with a steering wheel, and there is provided a control mechanism with a recess being formed in the outer circumference of the input shaft and a plurality of balls inserted in the recess. The plurality of balls are arranged such that they press against the input shaft with fluid pressure when they are supplied with pressure fluid. The fluid pressure is controlled by a pump which is adjusted in accordance with the speed of the vehicle so that the fluid pressure is increased to press the balls forcefully against the input shaft when the speed of the vehicle is high so to thereby weaken the action of the power steering apparatus. In this case, the fluid supplied to the balls is obtained by controlling the high pressure fluid from the pump, and there occurs a large pressure difference between the fluid pressure and the main pressure of the steering apparatus. Therefore, there is the disadvantage that precise fluid pressure control for the control mechanism and the steering apparatus is required and therefore the arrangement of the valve is complicated.

SUMMARY OF THE INVENTION

An object of the present invention is to provide an oil pressure control device having a control valve with a simplified arrangement in a power steering apparatus of the kind described above.

According to the present invention, in a power steering apparatus provided with an input shaft, an output shaft connected with one end of the input shaft, and a control valve provided to cause a plunger to press against the input shaft, so that pressure fluid from a pump is selectively supplied to a cylinder by the relative displacement of the control valve to power-assist the rotation of the output shaft to thereby actuate a steering wheel, there is provided an oil pressure control device which comprises: control means arranged to be capable of pressing the outer circumference of the input shaft; a throttle valve provided in a returning circuit of the fluid from the power steering apparatus to the pump and controlled in accordance with the speed of the vehicle and a fluid passage member for guiding the fluid controlled by the throttle valve to the control means.

In a preferred embodiment according to the present invention, the control means is provided with at least one plunger mention above arranged so that an end of the plunger is capable of pressing against the input shaft, and with an oil pressure reaction chamber which is provided at the other end of the plunger and into which the fluid from the fluid passage member is supplied.

The fluid pressure control circuit in the power steering apparatus according to the present invention is arranged so that the control means is not supplied with high pressure fluid directly from a pump, unlike the conventional case, but is supplied with the fluid returning from the power steering apparatus to the pump while controlling the returning fluid, so that it is possible to easily obtain high pressure fluid and it is also possible to make smaller the difference between the fluid pressure in the control valve and the fluid pressure applied to the control means in comparison with the conventional case, so that the structure of the valve can be simplified.

BRIEF DESCRIPTION OF THE DRAWING

A single FIGURE of the drawing is a longitudinal sectional view illustrating an embodiment according to the present invention.

DETAILED DESCRIPTION OF PREFERRED EMBODIMENT

In an outer casing 11, there are provided a hollow input shaft 12, a torsion bar 13 axially extending into the input shaft 12, and an output shaft 14 connected with the input shaft 12 by the torsion bar 13. A pinion 15 is integrally formed on the output shaft 14 and a rack 16 connected with the steering wheel (not shown) is in mesh with the pinion 15. A rotary valve 17 and a ring-like plunger 18 are fitted to the outer circumference of the input shaft 12. The rotary valve 17 communicates with an inlet port 19 provided in the outer casing 11 and the inlet port 19 communicates with an oil tank 22 through a pressure pump 21. An oil pressure reaction chamber 23 is provided by forming a continuous groove in the outer circumferential surface of the plunger 18. As a return opening for the pressure oil supplied from the inlet port 19, an outlet port 24 is provided in the outer casing 11 at a distance above the inlet port 19 and communicates with the oil tank 22 through an oil passage 25. A recess 26 against which the plunger 18 is urged is provided in the input shaft 12 at an outer peripheral portion oposite the plunger 18. The rotary valve 17 communicates also with cylinder ports 27 and 28 which in turn communicate with a cylinder shown diagrammatically at 30. Such a power steering apparatus is known, for example, from U.S. Pat. No. 3,433,127, etc.

According to the present invention, a throttle valve 31 is provided in the path of the oil passage 25 returning from the outlet port 24 to the oil tank 22. The throttle valve 31 is controlled by a controller 33 which receives an output signal produced from a vehicle speed sensor 32 for detecting the speed of a vehicle to produce an output corresponding to the speed of the vehicle and which converts the received signal into a pulse or a current for controlling the throttle valve 31. An oil passage 34 communicating with the oil pressure reaction chamber 23 is in communication with to the outlet port 24.

Next, referring to the operation of the arrangement as described above, the oil placed under pressure by the pump 21 is supplied from the inlet port 19 to the rotary valve 17. The oil supplied to the rotary valve 17 is supplied to the cylinder 30 through the left and right cylinder ports 27 and 28 in accordance with the rotary torque and the torsional displacement of the input shaft 12 relative to the pinion 15 produced depending on the degree of resistance to turning of the steering wheel, so as to actuate the rack 16 to effect steering. The oil returning from the cylinder returns from the outlet port 24 to the oil tank 22. At this time, when vehicle wheels are rotating at a high speed, the throttle valve 31 is controlled to be throttled by the controller 33 more than at low speed or during a period of stopping. When the wheels are rotating at a high speed, therefore, the oil pressure in the oil passage 34 is increased by the throttle valve 31 to a degree of, for example, 10 kg/cm$^2$, and high pressure oil is supplied to the oil pressure reaction chamber 23. Accordingly, the plunger 18 is pressed inwardly to press against the recess 26 in the input shaft 12 to thereby make harder the rotation of the input shaft 12, that is, the steering operation.

In the embodiment, a seal mechanism constituted by an O ring 35 is provided between an end of the input shaft 12 adjacent the recess 26 and an end of the torsion bar 13. Arrangement is made such that the oil leaking from the rotary valve 17 and from the oil pressure reaction chamber 23 is returned to the oil tank 22 through the oil passage 37 from a drain hole installed in a part of the output shaft 14.

What is claimed is:

1. In a power steering apparatus connected to a pump and a cylinder and provided with an input shaft, an output shaft connected with one end of said input shaft, and a control valve rotatable about said input shaft so that fluid under pressure from the pump is selectively supplied to the cylinder upon relative displacement of said control valve to thereby power-assist the rotation of said output shaft to thereby actuate steering wheels of a vehicle, an oil pressure control device comprising:

control means for pressing against the outer circumference of said input shaft;

a throttle valve provided in a return circuit of said fluid from said power steering apparatus to said pump and controlled in accordance with the speed of the vehicle; and a fluid passage member connected between an inlet of said throttle valve and an inlet of said control means for guiding said fluid controlled by said throttle valve to said control means to thereby cause said conrol means to be pressed against said input shaft.

2. An oil pressure control device in a power steering apparatus according to claim 1, in which said control means is provided with at least one plunger arranged so that an end of said plunger is capable of pressing against said input shaft, and with an oil pressure reaction chamber which is provided in the other end of said plunger and into which said fluid from said fluid passage member is supplied.

3. An oil pressure control device in a power steering apparatus, as defined in claim 2, in which said oil pressure reaction chamber is formed in the outer circumference of said plunger and defined by a recess for storing said fluid.

* * * * *